Dec. 31, 1957   L. R. BELL ET AL   2,817,933
WRAPPING MACHINE ARTICLE CONVEYING MECHANISM
Filed Oct. 27, 1954   5 Sheets-Sheet 3

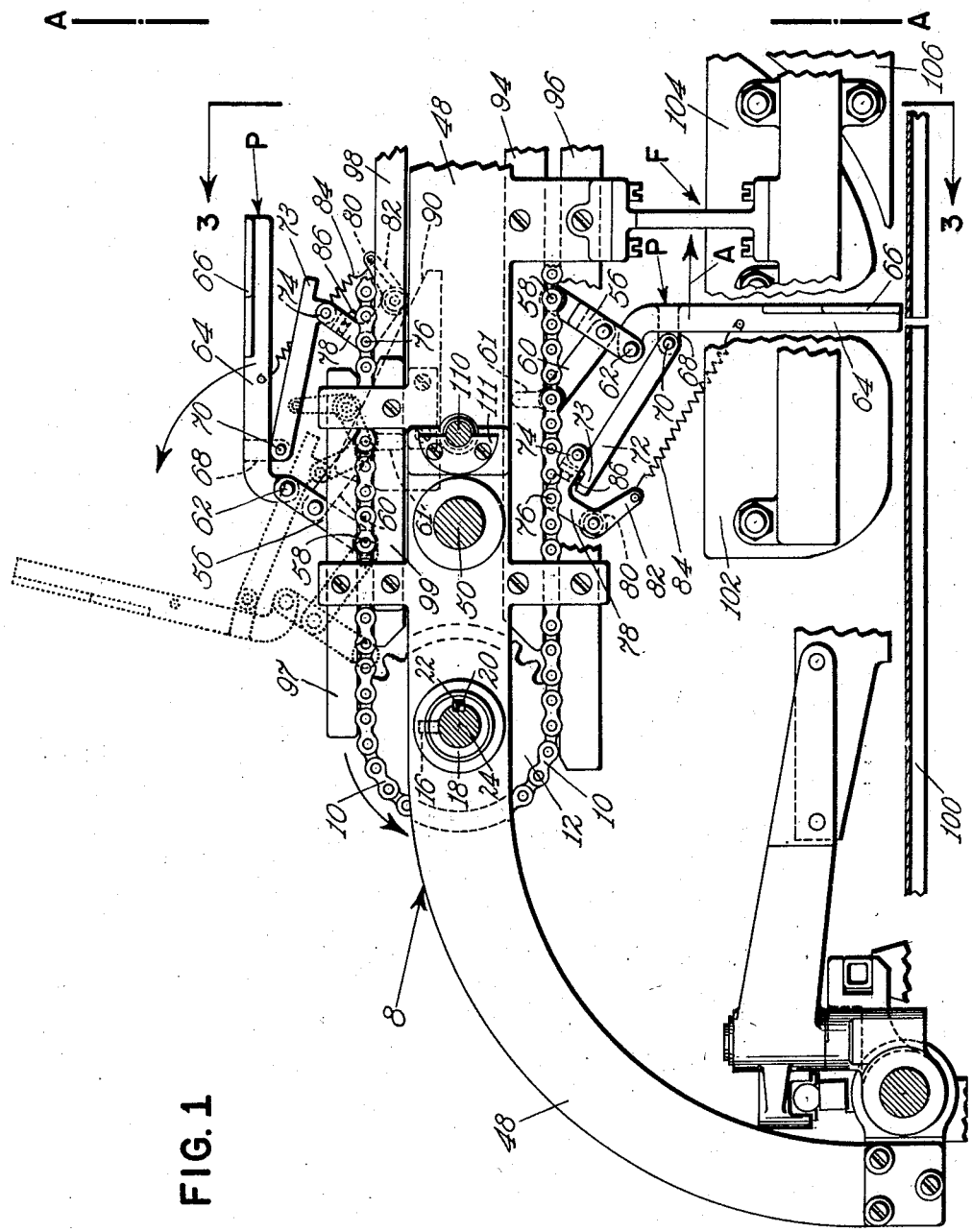

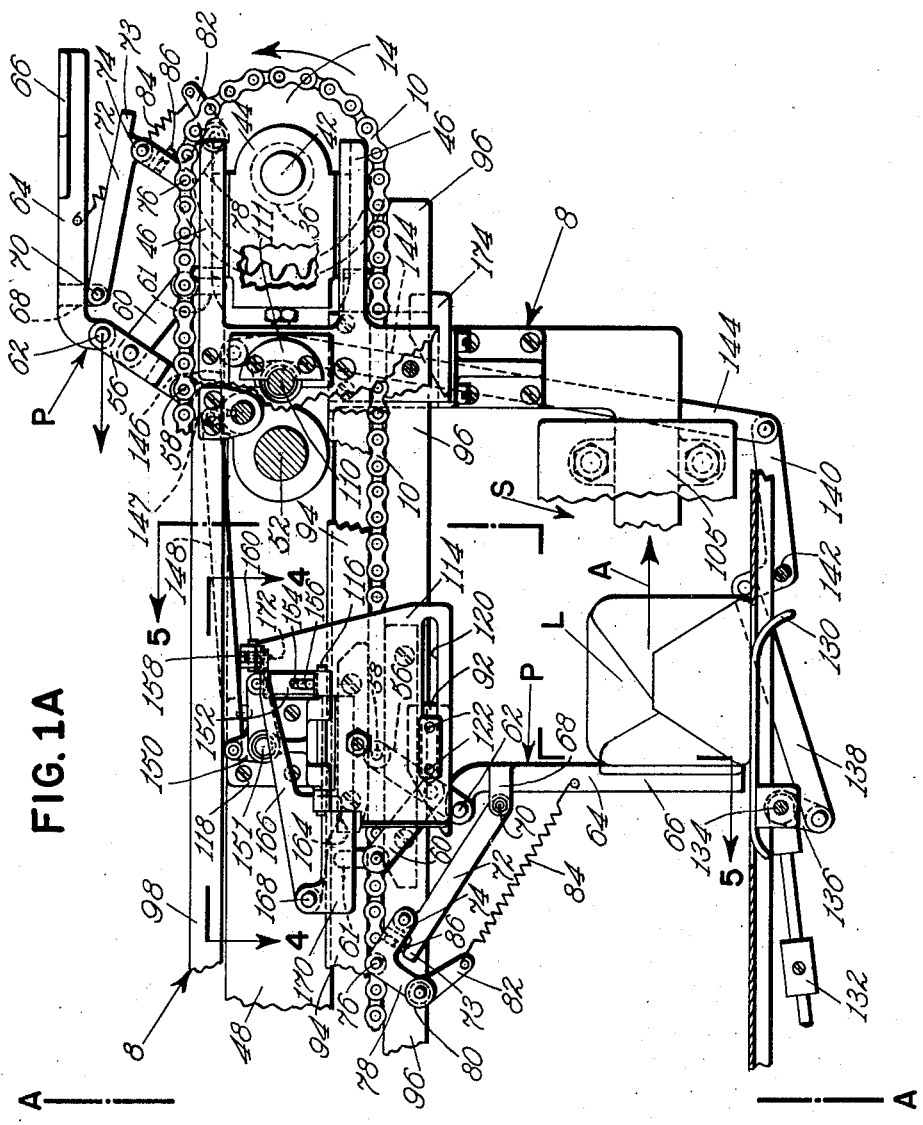

INVENTOR
LEO R. BELL
GEORGE PANULINE
BY Wentworth & Clapham
ATTORNEY

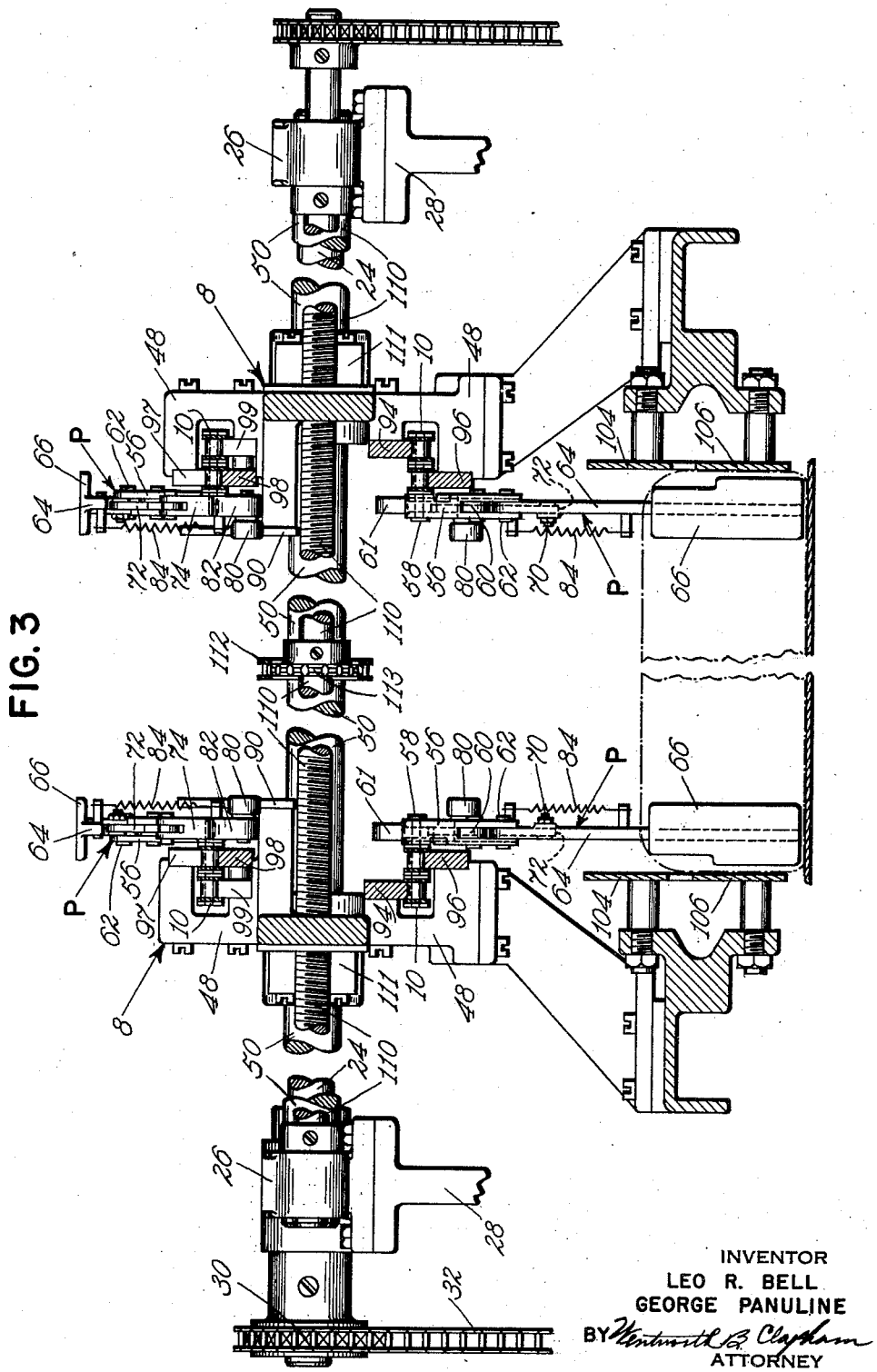

Dec. 31, 1957 L. R. BELL ET AL 2,817,933
WRAPPING MACHINE ARTICLE CONVEYING MECHANISM
Filed Oct. 27, 1954 5 Sheets-Sheet 5
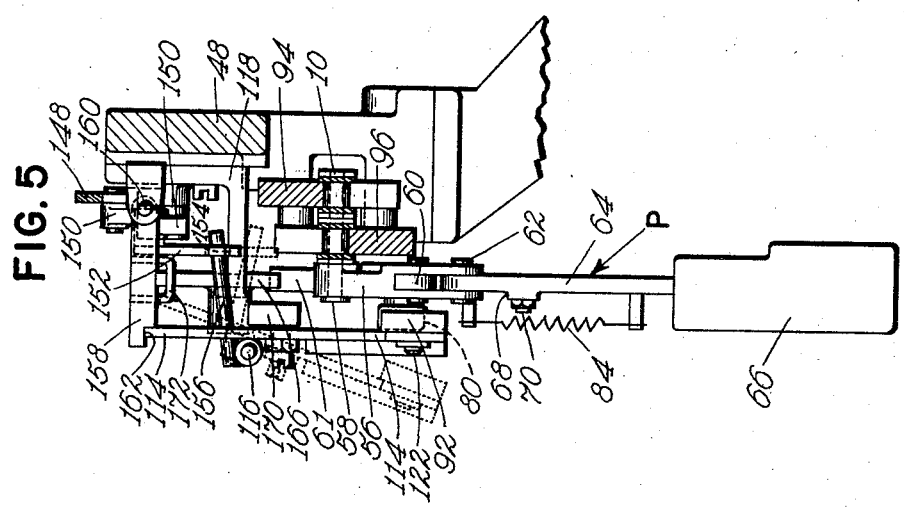
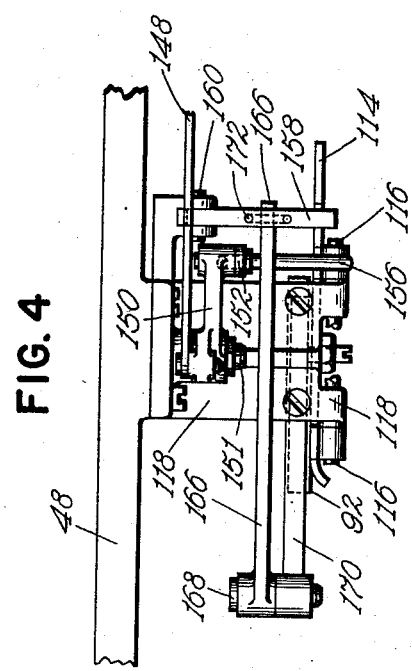
INVENTOR
LEO R. BELL
GEORGE PANULINE
BY
ATTORNEY United States Patent Office 2,817,933
Patented Dec. 31, 1957

2,817,933

WRAPPING MACHINE ARTICLE CONVEYING MECHANISM

Leo R. Bell, Packanack Lake, N. J., and George Panuline, Fresh Meadows, N. Y., assignors to American Machine & Foundry Company, a corporation of New Jersey Application October 27, 1954, Serial No. 465,003

16 Claims. (Cl. 53—52)

This invention relates to wrapping machines and more particularly to improved mechanism for moving articles being wrapped past the associated folding, and sealing instrumentalities of the machine and insuring the final ejection of wrapped articles from the machine.

The invention consists in improvements in the conveying mechanism which conveys articles being wrapped to and through a folding and seal way, and provides relatively simple and readily adjustable means operatively associated therewith for varying the lateral spacing between the pushers of sets of conveyor flights, the folding apparatus, and the sealing mechanism, thereby readily adapting the machine for handling and packaging a wide range of lengths of articles.

The invention furthermore makes possibe a novel structural arrangement whereby a last wrapped and sealed article ejecting mechanism is operatively integrated with an article conveying mechanism provided with sets of pushers, and wherein the sets of pushers can rapidly and simply be adjusted laterally to and from each other in accordance with a selected length of article to be wrapped.

The invention also consists in the provision of a novel endless conveyor mechanism including a double chain conveyor and means operatively engaged with at least a part of each chain to stabilize the conveyer pushers so that when the pushers engage an article, there can be no substantial lateral movement of the pusher relative to the path of travel of the pushers. It is a further object of the invention to provide means positively insuring the substantial elimination of friction between the endless chains and the stabilizing means coacting therewith.

Other objects of my invention will be set forth in the following description and drawings which illustrate preferred embodiments thereof, it being understood that the above statement of the objects of our invention is intended generally to explain the same without limiting it in any manner.

In accordance with the invention, there is provided an integrated system of folding members, and sealing units spaced from each other along the path of travel of articles being moved therepast by our novel adjustable conveyor mechanism. The conveyor mechanism comprises a plurality of sets of longitudinally spaced conveyor flights or pushers and supporting means adapting the flights or pushers of each set for ready and rapid accurate adjustment to or from each other to accommodate a selected length of article to be wrapped.

In the embodiment of the invention illustrated herein, each pusher of each pair of pushers is supported on a suitable bracket attached to a double endless chain. The chain supports and sprockets are mounted for movement to and from each other in order to space the pushers laterally as desired.

In the accompanying drawings which illustrate a preferred embodiment of the invention and in which like reference characters indicate the same or like parts:

Figs. 1 and 1A when joined on line A—A illustrate a sectional side elevation of a wrapping machine embodying the invention, the center part being broken away;

Fig. 3 is a sectional end elevation taken on line 3—3 of Fig. 1;

Fig. 4 is a partial view of the last article wrapped ejector mechanism taken on line 4—4 of Fig. 1A;

Fig. 5 is an end elevation taken on line 5—5 of Figure 1A.

Figure 2:
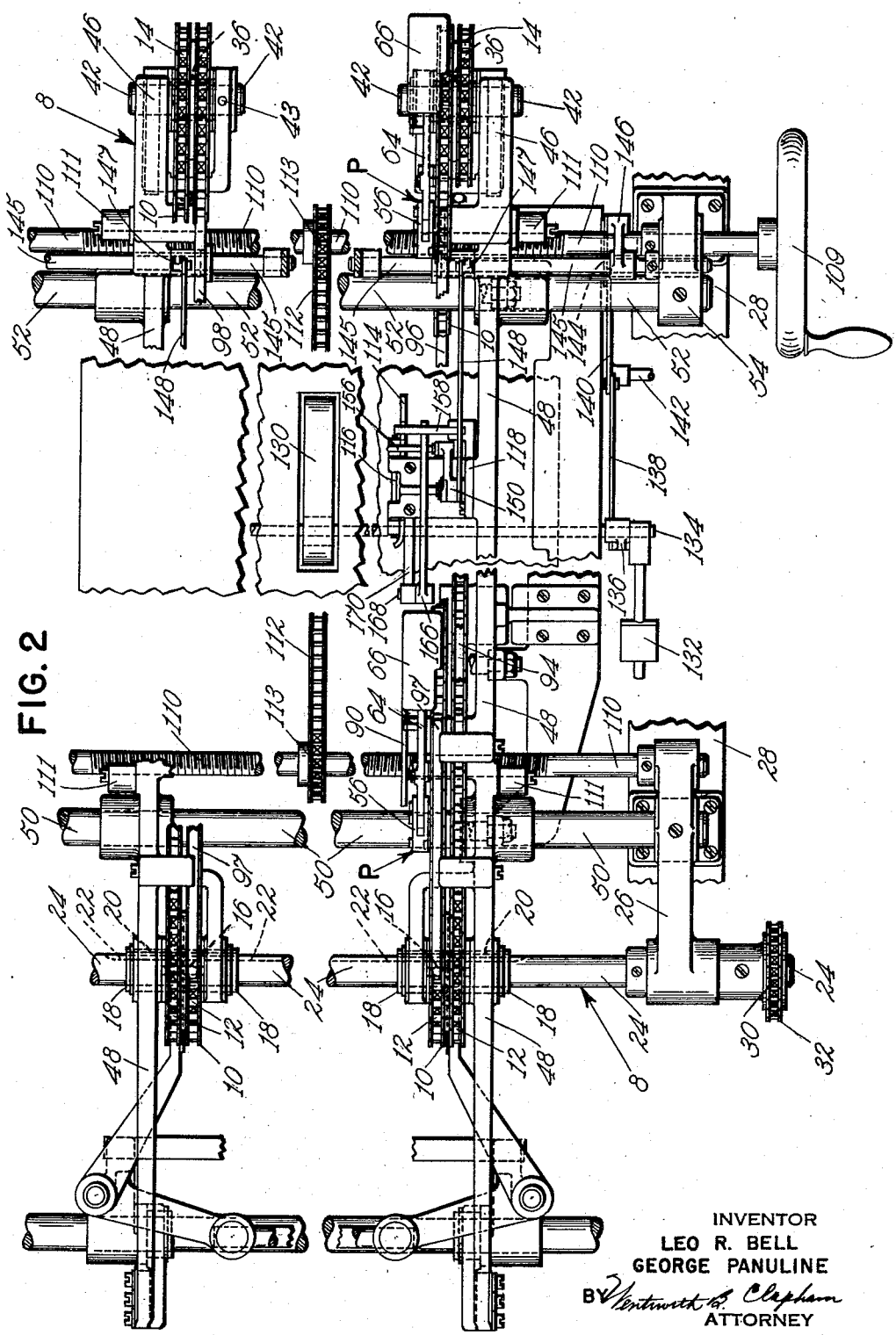
Fig. 2 is a plan view of the mechanism shown in Fig. 1, with the central portion and duplicated parts broken away.

Referring to the drawings, the mechanism illustrated is adapted primarily for use in wrapping machines of the general type disclosed in Schmitt Patent 1,851,295 and Farmer et al. Patent 2,006,711 wherein partially wrapped articles are moved by a top transfer conveyor through a foldway and a sealway for completion of the wrapping and sealing of packages, and wherein the last of a series of wrapped packages is positively ejected from the machine.

In the illustrated embodiment of the invention, the top transfer conveyor, designated generally 8, comprises two laterally spaced double strand roller chains 10. Each chain 10 runs on a double driving sprocket 12 and a double driven sprocket 14. Each driving sprocket 12 is secured by a key 16 to a sleeve 18 (Figures 1 and 2). Each sleeve 18 is provided with a key 20 which slidingly engages a keyway 22 in drive shaft 24. The ends of shaft 24 are mounted in suitable brackets 26 fixed to the machine frame 28 (Figures 2 and 3). Attached to one end of shaft 24 is a sprocket 30 which is driven continuously by chain 32 by a sprocket (not shown) on the main drive shaft of the machine (not shown).

Each double sprocket 14 is provided with a bearing 36 rotatably mounted on a jack shaft 42 (Figures 1A and 2). Pins 43 secure shafts 42 in suitable slidable blocks 44 adjustably held in tracks of the forked ends 46 of horizontal top laterally spaced frame members 48. These frame members are parallel and extend along substantially the entire length of top transfer conveyor 8.

Frame members 48, as shown in Figures 1, 1A, 2 and 3, are supported for lateral adjustment to and from each other on cross shafts 50 and 52. Cross shaft 50 is supported and held in bearing bracket 26 mounted on machine frame members 28. Cross shaft 52 is supported and held in suitable brackets 54 also carried by frame members 28.

Top transfer conveyor 8 is provided with a plurality of sets of article pushers or flights, designated generally P. One pusher or flight P of each set is carried by one of the spaced chains 10. The pushers constituting the several sets of pushers P are spaced equidistantly along the length of chains 10. As shown in Figures 2 and 3, the pushers P on one chain 10 are not connected to their complements on the other chain 10.

The pusher construction is the same for all pushers P of the several sets, and therefore only one is described in detail. A pusher P comprises a supporting arm 56 pivotally attached by a stud 58 to a chain 10. Supporting arm 56 is formed with a fork on its free end, in which fork is pivotally connected one end of a stabilizing link 60. The other end of link 60 is attached to chain 10 at a suitable distance from pivot connection 58, or rearwardly of the face of pusher P as it engages and advances an article. See Figure 1A. Also pivotally mounted in the forked end of supporting arm 56 is a stud 62 on which is loosely, swingably mounted a pusher arm 64 which on its free end is provided with an article engaging plate or flight 66.

The upper end of arm 64, as viewed in Figures 1, 1A, 3, and 5, is provided with a rearwardly extending lug 68 supporting a stud 70 to which one end of a toggle link 72 is pivotally connected. The other end of link 72 is pivoted to a toggle lever 74. One arm of lever 74 is pivotally attached to chain 10 by stud 76. The other arm 78 of toggle lever 74 carries a cam follower 80, and also is provided with an extension 82 to which is attached one end of spring 84. The other end of this spring is secured to pusher arm 64. Spring 84 operates to maintain the toggle, which comprises link 72, and arm 74, locked in expanded position and thus pusher arm is held in proper upright article advancing position during the movement of an article L thereby in the direction of arrows A, Figures 1 and 1A.

Since it may be desired to adjust the operative position of pushers P, which is controlled by the expanded position of the toggle, toggle arm 74 carries a set screw 86, which projects from arm 74 and bears against the tip end 73 of link 72 when the toggle is in expanded position.

In the operation of the top transfer conveyor 8, partially wrapped articles L, such as loaves of bread, are delivered by a lifter table 100 into the range of action of pushers P. Lifter table 100 may be similar in construction and operation to that shown in the above referred to Schmitt patent. The rotation of shaft 24 results in the movement of pushers P into engagement with partially wrapped articles L on lifter table 100, whereupon they are moved between folders 102, 104 and 106 of conventional design mounted on brackets 103, and thence past conventional heat sealing devices 105, which completes the wrapping and sealing operation.

As shown in Figure 1, each set of pushers P before moving around sprockets 12, is located in a substantially horizontal position, as indicated in full lines. However, the travel of chain 10 causes cam followers 80 to run onto cams 90 which shifts link 72 and arm 74 into expanded toggle position, thereby locating arm 64 as shown in full lines in the lower portion of Figures 1 and 1A. There are two cams 90, each one being suitably attached to each frame member 48.

Pusher arms 64 remain in operative substantially vertical position and move articles through foldway F and sealway S until cam followers 80 engage and run on cams 92, which are mounted on frame members 48. When cam followers 80 engage cams 92, the toggles are broken and springs 84 return pusher arms 64 into their inoperative substantially horizontal positions, as shown in the upper part of Figure 1A.

It is essential that each pusher arm 64 of each set of pushers P occupies its predetermined position during the operation of the machine, and especially when the sets of pushers are moving articles through the foldway F and sealway S. Otherwise, experience has shown that the wrapping material tends to drop back of each article being wrapped. This results in imperfect and unsightly packages. These disadvantages are overcome by our invention through the provision of our novel pusher chain construction, and mechanism for stabilizing each pusher arm 64 against individual lateral movement as it travels through the foldway and sealway. As disclosed in Figures 1, 1A, 2, 3, and 5, elongated bars or rails 94 and 96 extend along the path of travel of the lower outer and inner laps of chains 10, respectively. These ends of rails 94 and 96 are fixed by suitable conventional means to frame member 48. It will be seen from a consideration of Figure 3 that because of the arrangement of rails 94 and 96 in engagement with chain 10, there is a rolling of the chain rollers on the respective bars, which eliminates binding and wear. Also because of the arrangement shown and described, tilting of pusher arms 64 is practically eliminated, and pusher arms 64 are thereby positively stabilized.

The top laps of chains 10 are supported against sag by bars or rails 98 which extend along substantially the entire length of the upper lap of chains 10. The ends of rails 98 are suitably attached to frame members 48.

Adjacent cams 90 are provided with relatively short bars 97 and 99 which engage the top and bottom sides, respectively, of the inner and outer laps of chains 10. These bars effectively prevent twisting of the chain and sets of pushers thereon when cam followers 80 engage and run on cams 90.

Referring to Figure 2, elongated laterally spaced frame members 48 extend along substantially the entire operative length of the machine. It is important to note that in accordance with our invention, any desired adjustment of the machine in order to handle articles of selected length within a large range of sizes, say five to sixteen inches, may be effected with great ease and freedom from binding of the adjusting operating parts. This is because shaft 24 functions only to drive the top transfer conveyor 8. Shafts 50 and 52 provide supports for the entire upper frame section of the machine including conveyor 8, frame members 48, brackets 103, the folders 102, 104 and 106, and sealing means 105. Right-left handed threaded shafts 110 perform the sole function of adjusting frame members 48 to and from each other, and hence all parts supported thereby are moved simultaneously to and from each other.

The threaded portions of shafts 110 engage half nuts 111 suitably mounted on frame members 48. See Figures 1, 1A, 2 and 3. Each shaft 110 has attached thereto a sprocket 113 on which runs a chain 112. Thus when hand wheel 109 attached to one of the shafts 110 is turned, frame members 48 are moved towards or from each other the amount desired, and accordingly pushers P, folders 102, 104 and 106, and heat sealing means 105, are also located in desired adjusted relationship conforming to the demands of the length of articles to be wrapped.

As illustrated in Figure 1A, cams 92 are adjustably mounted on plates 114. These plates (Figure 5) are pivotally supported on pins 116 supported on brackets 118 fixed to frame members 48. The adjustment of cams 92 is longitudinal of the length of the machine for the purpose of compensating for various widths of articles being wrapped. In the case of a narrow article, such as a loaf of bread, cam 92 would be adjusted in slot 120 to the right in order to provide the desired drop-off point of pusher arms 64 with respect to the articles being wrapped. Cam 92 is secured in adjusted position by suitable bolts and nuts, designated 122.

In the normal operation of the machine when a succession of articles is being advanced by pushers P through foldway F and sealway S, the drop-off of pushers P occurs when cam followers 80 run on cams 92. This allows wrapped articles to be positioned for a predetermined amount of time with their ends between heat sealing means 105. Each article advancing from the foldway pushes a heat sealed package along and out of sealway S. At the end of a run, there being no additional articles to move a heat sealed package out of sealway S, it is highly desirable that such package be moved out of the sealway S, otherwise it will be damaged and rendered unfit for sale.

The invention also includes improved mechanism for effecting the positive displacement of the last package of a series of packages out of the machine.

Each article L in passing through the machine, will depress sensing finger 130 which is normally held upwardly into the path of travel of an article moving through the sealway by weighted arm 132 attached to a shaft 134 which supports finger 130 in the path of travel of the article moving through the sealway S. A lever 136, attached to shaft 134, is connected at its free end to a link 138, the other end of link 138 being attached to one arm of the bell crank lever 140 suitably pivotally supported at 142 in the frame of the machine. The other arm of bell crank lever 140 is attached to a long link 144 which at its other end is pivotally attached to an arm 146 mounted on a shaft 145. On the latter is mounted another arm 147 which is connected to a long link 148 which in turn is connected to a bell crank lever 150 pivotally mounted on a pin 151 supported suitably in bracket 118.

Pivotally mounted on the free end of bell crank 150 and depending substantially vertically therefrom is a link 152 provided at its other end with an elongated slot 154 in which engages a pin 156 fastened to plate 114. The center of gravity of plate 114 and the parts assembled therewith and thereon is such that unless this assembly is held in the position shown in full lines in Figure 5, it will swing out into the position shown in broken lines in Figure 5. The reason for this arrangement will be described further hereinafter.

A gravity biased latch 158 pivotally mounted on pin 160 supported in an extension of bracket 118 is provided with a nose 162 adapted to engage the upper end of plate 114 and hold it in the position shown in Figure 5 in solid lines.

The action of members 130, 132, 134, 136, 138, 140, 142, 144, 145, 146, 147, 148, 150, 152, 154, 156 and 114 can be summarized by stating that when an article L passes through the foldway F and sealway S, it depresses finger 130. If plate 114 is in the position shown in broken lines in Figure 5, the action of finger 130 will be to rotate plate 114 counter-clockwise into the position shown in full lines in Figure 5. If, however, plate 114 is already in the position shown in full lines in Figure 5, the depression of finger 130 will have no effect on plate 114. In rotating clockwise from the dotted to the position shown in full lines in Figure 5, the upper edge of plate 114 cams latch member 158 upwards until the upper edge of plate 114 has passed the nose 162 of latch 158, at which time the gravity biased latch 158 drops downwardly, thereby latching plate 114 in the position shown in full lines in Figure 5.

Formed on the end of each link 60, adjacent pivot point 58, is a lug 61. As each set of pushers P moves into the range of action of sensing finger 130, the respective lug 61 associated therewith, is adapted to engage cam 164 formed on lever 166 pivotally mounted on a pin 168 carried in a bracket 170 suitably attached to bracket 118. The free end of lever 166 extends through a hook 172 depending from the under side of latch lever 158, so that as a pusher set P is passing the range of action of sensing finger 130, lug 61 engages cam surface 164 and lever 166 is caused to move upwardly, and the nose 162 of latch 158 is disengaged from the top of plate 114, and the latter swings clockwise by the action of gravity, as viewed in Figure 5, into broken line position.

The operation of the last package ejecting mechanism is as follows: In the case of a continuous succession of articles passing through the foldway and sealway of the machine, plate 114 will be held in a position shown in full lines in Fig. 5 until latch 158 is disengaged from plate 114. This occurs each cycle when lug 61 engages cam surface 164. However, at this instant, since sensing finger 130 is depressed by an article L passing thereover, plate 114 is maintained in its substantially vertical position by the action of the system of links and levers as described above. In the case where an article is skipped, or at the end of a continuous succession of articles, the action of lug 61, coacting with cam 164 on lever 166, causes latch 158 to be lifted. Since in this case finger 130 is not depressed, plate 114 swings to the position shown dotted in Fig. 5. Plate 114 will remain in this position for all succeeding cycles until an article again depresses finger 130 thereby returning plate 114 to the position shown in solid lines in Figure 5. Therefore, so long as a succession of packages is being moved through the machine and out of the foldway as described above, sensing finger 130 is being depressed successively by each article, and cam 92 remains located in position to be engaged by the cam follower 80 of each successive set of pushers P, thereby causing the pusher to be swung upwardly into substantially horizontal position by the action of spring 84 as the toggle linkage, consisting of link 72 and arm 74, is unlocked thus causing the article L to be dropped off in the sealway portion of the machine where it remains until the next advancing article pushes it forwardly through or out of the sealway.

When there is a skip in the succession of wrapped articles or the wrapper of the last article is about to be sealed, sensing finger 130 is not depressed. This results in cam 92 being moved out of the path of travel of the cam follower of the set of pushers P which is not advancing an article, and hence the pusher arms 64 remain in their substantially vertical operating position until the cam followers 80 engage and run on cams 174 mounted on frame members 48. As the result of the continued operation of pusher arms 64, any packages remaining in sealway S are moved thereby out of the sealway before pusher arms 64 are moved to drop-off position because of the coaction of cam followers 80 with cams 174.

The invention above described may be varied in construction within the scope of the claims, for the particular device, selected to illustrate the invention, is but one of many possible concrete embodiments of the same. It is not, therefore, to be restricted to the precise details of the structure shown and described.

What we claim is:

1. In a wrapping machine of the type having an article foldway having folders for wrapping a wrapper about an article; a conveyor for moving a succession of articles being wrapped through said foldway, laterally spaced frames mounting said conveyor, said conveyor comprising a driving double sprocket and a driven double sprocket carried by each of said frames, a double strand endless chain running on each of said driving and driven double sprockets, a plurality of side by side sets of pushers mounted substantially equidistantly along the length of each of said chains, and means swingably mounting each of said pushers on its respective double strand chain for movement in a substantially vertical plane into and out of engagement with an article moved thereby through said foldway.

2. In a wrapping machine of the type having an article foldway having folders for wrapping a wrapper about an article; a conveyor for moving a succession of articles being wrapped through said foldway, laterally spaced frames mounting said conveyor, said conveyor comprising a driving double sprocket and a driven double sprocket carried by each of said frames, a double strand endless chain running on each of said driving and driven double sprockets, a plurality of side by side sets of flights mounted substantially equidistantly along the length of each of said chains, means swingably mounting each of said pushers on its respective double strand chain for movement in a substantially vertical plane into and out of engagement with an article moved thereby through said foldway, and means for adjusting each of said frames to or from each other to vary the lateral spacing of said flights of said sets of flights.

3. The invention defined in claim 1 including an elongated bar mounted on each of said frames extending lengthwise of said conveyor beneath the inner strand of each of said chains, and an elongated bar mounted on each of said frames extending lengthwise of said conveyor above the outer strand of each of said chains, said bars being adapted to support and maintain the lower laps of said double strand chains against twisting, whereby said flights are constantly held in substantially vertical position during their travel through said foldway.

4. The invention defined in claim 2 including an elongated bar mounted on each of said frames extending lengthwise of said conveyor beneath the inner strand of each of said chains, and an elongated bar mounted on each of said frames extending lengthwise of said conveyor above the outer strand of each of said chains, said bars being adapted to support and maintain the lower laps of said double strand chains against twisting, whereby said flights are constantly held in substantially vertical position during their travel through said foldway.

5. In a wrapping machine of the type having an article foldway provided with folders for folding a wrapper about articles moving therethrough, a sealway having means for sealing the folds of wrappers enclosing said articles, a conveyor for moving a succession of articles to be wrapped and wrapped articles to be sealed through said foldway and sealway, respectively, laterally spaced frames mounting said conveyor comprising a driving double sprocket, and a driven double sprocket, carried by each of said frames, a double strand endless chain running on each of said driving and driven sprockets, a plurality of sets of side by side complementary pusher arms mounted substantially equidistantly along the length of said chains, means swingably mounting each of said pushers on its respective double strand chain for movement in a substantially vertical plane into and out of engagement with an article moved thereby through said foldway, and stabilizing members engaging and supporting the under side of one of said strands and the upper side of the other of said strands of each of said chains, whereby said pusher arms are maintained against substantial lateral motion during their travel through said foldway and sealway.

6. The invention defined in claim 2 wherein said adjusting means comprises longitudinally spaced right-left hand threaded rods, bearings supporting said rods, and readily detachable half nuts mounted on each of said frames and engaging the threaded portions of said rods.

7. The combination with a sealway of a wrapping machine of a conveyor having sets of pushers located substantially equidistantly along its length for pushing packages into said sealway, means operative normally to move each set of pushers out of engagement with a package advanced thereby upon delivery of a package into said sealway, mechanism operative in response to the failure of a succeeding set of pushers to advance a package into said sealway to maintain said last-named set of pushers in active article forwarding position to push packages in said sealway through and out of said sealway, said mechanism including a plate supporting said means, a device normally holding said means in operative position, an article trip normally positioned for engagement by a package being advanced by a set of pushers, means operative if said trip remains in the path of travel of articles for operating said device to effect the movement of said plate to inoperative position, and other means operative in response to the delivery of a package out of said sealway by a set of pushers for moving said last-named set of pushers upwardly and out of engagement with said last-named package.

8. In a wrapping machine of the type having an article foldway provided with folders for folding a wrapper about articles moving therethrough, a sealway having means for sealing the folds of wrappers enclosing said articles, a conveyor for moving a succession of articles to be wrapped and wrapped articles to be sealed through said foldway and sealway, respectively, laterally spaced frames mounting said conveyor comprising a driving sprocket, and a driven sprocket, carried by each of said frames, an endless chain running on each of said driving and driven sprockets, a plurality of sets of side by side complementary pusher arms mounted substantially equidistantly along the length of said chains, means spaced along the path of travel of said pusher arms for moving said pusher arms out of engagement with articles advanced thereby substantially upon delivery of wrapped packages in succession into said sealway, means operative in response to a skip of an article in said succession or the delivery of the last wrapped package of a succession of articles to said sealway for incapacitating said first- named means, whereby said pusher arms engage and move said article completely through and out of said foldway, and other means along the path of travel of said pusher arms for moving said arms upwardly out of engagement subsequent to the delivery of said wrapped sealed article out of said sealway.

9. In a wrapping machine of the type having an article foldway provided with folders for folding a wrapper about articles moving therethrough, a sealway having means for sealing the folds of wrappers enclosing said articles, a conveyor for moving a succession of articles to be wrapped and wrapped articles to be sealed through said foldway and sealway, respectively, laterally spaced frames mounting said conveyor comprising a driving sprocket and a driven sprocket, carried by each of said frames, an endless chain running on each of said driving and driven sprockets, a plurality of sets of side by side complementary pusher arms mounted substantially equidistantly along the length of said chains, a cam follower for each of said pusher arms, cams located along the path of travel of said sets of pushers and normally adapted to be engaged by said cam followers for moving said pushers of each set of pushers out of engagement with each package moved thereby into said sealway, a pivoted gravity biased plate supporting each of said cams, a latch normally securing each of said plates against movement to locate said cams in position to be engaged by said cam followers, a trip member, means normally positioning said trip member in the path of travel of articles being moved into said sealway, means operative in response to the failure of a set of pushers to advance a package into said sealway for unlatching said plate whereby said cams move out of the path of travel of said cam followers, means for maintaining said pushers of a set of pushers which is free from engagement with an article in operative pushing position to engage and push a package through and out of said sealway, and other cam means located without said sealway for moving said pushers upwardly and away from a package moved by said pushers of said set of pushers out of engagement with said package.

10. The invention defined in claim 7 wherein said conveyor adjacent each of said sets of pushers is provided with an operating lug adapted to engage and momentarily operate said device, and other means operative in response to the engagement of said article trip by a package being advanced by a set of pushers provided with said lug actuating said device for nullifying the effect of said lug engaging said device.

11. Apparatus for controlling the position of drop off of pushers of a conveyor in a wrapping machine having a sealway comprising cams located along the path of travel of said pushers and normally adapted to be engaged by cam followers on said pushers for moving said pushers out of engagement with packages advanced thereby into said sealway, a pivoted gravity biased plate supporting each of said cams, a latch normally securing each of said plates against movement to locate said cams in position to be engaged by said cam followers, a trip member, means normally positioning said trip member in the path of travel of articles being moved into said sealway, means operative in response to the failure of a set of pushers to advance a package into said sealway for unlatching said plate whereby said cams move out of the path of travel of said cam followers, means for maintaining said pushers of a set of pushers which is free from engagement with an article in operative pushing position to engage and push a package through and out of said sealway, and other cam means located without said sealway for moving said pushers upwardly and away from a package moved by said pushers of said set of pushers out of engagement with said package.

12. In a wrapping machine of the type having an article foldway provided with folders for folding a wrapper about articles moving therethrough, a sealway having means for sealing the folds of wrappers enclosing said articles, a conveyor for moving a succession of articles to be wrapped and wrapped articles to be sealed through said foldway and sealway, respectively, laterally spaced frames mounting said conveyor comprising a driving double sprocket, and a driven double sprocket, carried by each of said frames, a double strand endless chain running on each of said driving and driven sprockets, a plurality of sets of side by side complementary pusher arms mounted substantially equidistantly along the length of said chains, stabilizing members engaging and supporting the under side of one of said strands and the upper side of the other of said strands of each of said chains, whereby said pusher arms are maintained against substantial lateral motion during their travel through said foldway and sealway, means spaced along the path of travel of said pusher arms for moving said pusher arms out of engagement with articles advanced thereby substantially upon delivery of wrapped packages in succession into said sealway, means operative in response to a skip of an article in said succession or the delivery of the last wrapped package of a succession of articles to said sealway for incapacitating said first-named means, whereby said pusher arms engage and move said article completely through and out of said foldway, and other means along the path of travel of said pusher arms for moving said arms upwardly out of engagement subsequent to the delivery of said wrapped sealed article out of said sealway.

13. In a wrapping machine of the type having an article foldway having folders for wrapping a wrapper about an article; a conveyor for moving a succession of articles being wrapped through said foldway, laterally spaced frames mounting said conveyor, said conveyor comprising a driving double sprocket and a driven double sprocket carried by each of said frames, a double strand endless chain running on each of said driving and driven double sprockets, a plurality of side by side sets of pushers mounted substantially equidistantly along the length of each of said chains, each of said pushers of said sets of pushers comprises a pusher arm lever, an article engaging plate mounted on one end of said lever, a link connecting the other end of said lever to one strand of said chain, a second link having one end connected to said first-named link and its other end connected to said chain at a point spaced rearwardly of said first-named connection, a lug projecting rearwardly from said pusher arm lever, a toggle comprising a toggle lever pivotally mounted on said strand of said chain at a point rearwardly of said last-named link connection, and a link connecting said lug and said toggle lever, a cam follower on said toggle lever, and a spring connected to said toggle lever and said pusher arm lever operative to maintain said toggle in expanded condition when said pusher arm is in substantially vertical position.

14. The invention defined in claim 13 including cams mounted along the path of travel of said cam followers, and means for driving said driving sprockets to engage said cam followers with said cams to break said toggle and move said pusher arms of a set of pushers out of engagement with an article advanced thereby.

15. In a wrapping machine of the type having an article foldway provided with folders for folding a wrapper about articles moving therethrough, a sealway having means for sealing the folds of wrappers enclosing said articles, a conveyor for moving a succession of articles to be wrapped and wrapped articles to be sealed through said foldway and sealway, respectively, laterally spaced frames mounting said conveyor comprising a driving double sprocket, and a driven double sprocket, carried by each of said frames, a double strand endless chain running on each of said driving and driven sprockets, a plurality of sets of side by side complementary pusher arms mounted substantially equidistantly along the length of said chains, stabilizing members engaging and supporting the under side of one of said strands and the upper side of the other of said strands of each of said chains, whereby said pusher arms are maintained against substantial lateral motion during their travel through said foldway and sealway, each of said pusher arms of said sets of pusher arms comprises a pusher arm lever, an article engaging plate mounted on one end of said lever, a link connecting the other end of said lever to one strand of said chain, a second link having one end connected to said first-named link and its other end connected to said chain at a point spaced rearwardly of said first-named connection, a lug projecting rearwardly from said pusher arm lever, a toggle comprising a toggle lever pivotally mounted on said strand of said chain at a point rearwardly of said last-named link connection, and a link connecting said lug and said toggle lever, a cam follower on said toggle lever, and a spring connected to said toggle lever and said pusher arm lever operative to maintain said toggle in expanded condition when said pusher arm is in substantially vertical position.

16. The invention defined in claim 14 including cams mounted above said sealway and along the path of travel of said cam followers, and means for driving said driving sprockets to engage said cam followers with said cams to break said toggle and move said pusher arms of a set of pushers out of engagement with an article advanced thereby into said sealway.

References Cited in the file of this patent

UNITED STATES PATENTS

| | | |
|---|---|---|
| 1,468,626 | Brownell | Sept. 26, 1923 |
| 1,610,729 | Baker et al. | Dec. 14, 1926 |
| 1,740,582 | Farmer | Dec. 24, 1929 |
| 2,650,459 | McGinley | Sept. 1, 1953 |
| 2,676,445 | Kottmann | Apr. 27, 1954 |
| 2,704,592 | Hoppe | Mar. 22, 1955 |